United States Patent
Reformato et al.

(10) Patent No.: US 7,912,199 B2
(45) Date of Patent: Mar. 22, 2011

(54) METHODS AND SYSTEMS FOR REMOTE CELL ESTABLISHMENT

(75) Inventors: John Reformato, East Meadow, NY (US); Stephen Brennan, Bedford, TX (US)

(73) Assignee: Telesector Resources Group, Inc., New York, NY (US)

( * ) Notice: Subject to any disclaimer, the term of this patent is extended or adjusted under 35 U.S.C. 154(b) by 919 days.

(21) Appl. No.: 10/720,943

(22) Filed: Nov. 24, 2003

(65) Prior Publication Data

US 2005/0053217 A1    Mar. 10, 2005

Related U.S. Application Data

(60) Provisional application No. 60/428,704, filed on Nov. 25, 2002, provisional application No. 60/436,018, filed on Dec. 26, 2002.

(51) Int. Cl.
*H04M 3/42* (2006.01)
*H04M 7/00* (2006.01)
*H04M 1/64* (2006.01)

(52) U.S. Cl. ........... 379/211.02; 379/88.01; 379/212.01; 379/219; 379/221.01

(58) Field of Classification Search .............. 379/211.02, 379/201.01, 114.23, 114.21, 88.01, 212.01, 379/219, 221.01
See application file for complete search history.

(56) References Cited

U.S. PATENT DOCUMENTS

| | | |
|---|---|---|
| 4,013,839 A | 3/1977 | Bell |
| 4,540,850 A | 9/1985 | Herr et al. ................. 379/88.19 |
| 4,600,814 A | 7/1986 | Cunniff et al. |
| 4,734,931 A | 3/1988 | Bourg et al. |
| 4,924,496 A | 5/1990 | Figa et al. |
| 5,014,303 A | 5/1991 | Velius |
| 5,168,515 A | 12/1992 | Gechter et al. |
| 5,222,125 A | 6/1993 | Creswell et al. |
| 5,274,700 A | 12/1993 | Gechter et al. |
| 5,327,486 A | 7/1994 | Wolff et al. ................ 379/93.23 |
| 5,329,578 A | 7/1994 | Brennan et al. |
| 5,428,663 A | 6/1995 | Grimes et al. |
| 5,440,624 A | 8/1995 | Schoof |
| 5,483,586 A | 1/1996 | Sussman |
| 5,533,096 A | 7/1996 | Bales |
| 5,535,265 A | 7/1996 | Suwandhaputra |
| 5,550,907 A | 8/1996 | Carlsen |
| 5,583,564 A | 12/1996 | Rao et al. |
| 5,586,173 A | 12/1996 | Misholi et al. |
| 5,588,037 A * | 12/1996 | Fuller et al. .............. 379/211.02 |

(Continued)

FOREIGN PATENT DOCUMENTS

CA    2240878    12/1998

(Continued)

OTHER PUBLICATIONS

"The Mobile Phone User Guide", http://www.mobileshop.org/usertech/wildfire.htm, printed Oct. 1, 2004.

(Continued)

*Primary Examiner* — Thjuan K Addy

(57) ABSTRACT

Methods and systems are described for remote establishment of a call from a first device to a second device. In said methods and systems the information is retrieved from the first device regarding the second device along with information associating the user with a device associated with the user. The call is then transferred to a switch associated with the user's device. The switch then forwards the call to the second device.

16 Claims, 5 Drawing Sheets

U.S. PATENT DOCUMENTS

| | | | |
|---|---|---|---|
| 5,608,788 A | 3/1997 | Demlow et al. | |
| 5,619,555 A | 4/1997 | Fenton et al. | |
| 5,621,787 A | 4/1997 | McKoy et al. | |
| 5,623,541 A | 4/1997 | Boyle et al. | |
| 5,631,904 A | 5/1997 | Fitser et al. | 370/261 |
| 5,638,434 A | 6/1997 | Gottlieb et al. | |
| 5,652,789 A | 7/1997 | Miner et al. | 379/201 |
| 5,661,788 A | 8/1997 | Chin | |
| 5,668,863 A | 9/1997 | Bieselin et al. | |
| 5,673,080 A | 9/1997 | Biggs et al. | |
| 5,692,213 A | 11/1997 | Goldberg et al. | |
| 5,710,591 A | 1/1998 | Bruno et al. | |
| 5,715,444 A | 2/1998 | Danish et al. | |
| 5,717,863 A | 2/1998 | Adamson et al. | |
| 5,719,925 A * | 2/1998 | Peoples | 379/201.01 |
| 5,724,412 A | 3/1998 | Srinivasan | |
| 5,742,095 A | 4/1998 | Bryant et al. | |
| 5,742,668 A | 4/1998 | Pepe et al. | |
| 5,742,905 A | 4/1998 | Pepe et al. | |
| 5,745,561 A | 4/1998 | Baker et al. | |
| 5,751,800 A | 5/1998 | Ardon | |
| 5,752,191 A | 5/1998 | Fuller et al. | |
| 5,764,901 A | 6/1998 | Skarbo et al. | |
| 5,805,670 A | 9/1998 | Pons et al. | |
| 5,841,837 A | 11/1998 | Fuller et al. | |
| 5,864,603 A * | 1/1999 | Haavisto et al. | 379/88.01 |
| 5,872,841 A | 2/1999 | King et al. | |
| 5,875,242 A | 2/1999 | Glaser et al. | 379/207 |
| 5,875,437 A | 2/1999 | Atkins | |
| 5,903,845 A | 5/1999 | Buhrmann et al. | 455/461 |
| 5,907,324 A | 5/1999 | Larson et al. | |
| 5,907,547 A | 5/1999 | Foladare et al. | 370/352 |
| 5,917,817 A | 6/1999 | Dunn et al. | |
| 5,917,912 A | 6/1999 | Ginter et al. | |
| 5,920,826 A | 7/1999 | Metso et al. | |
| 5,920,847 A | 7/1999 | Kolling et al. | |
| 5,926,535 A | 7/1999 | Reynolds | |
| 5,944,769 A | 8/1999 | Musk et al. | |
| 5,945,989 A | 8/1999 | Freishtat et al. | |
| 5,963,925 A | 10/1999 | Kolling et al. | |
| 5,982,870 A | 11/1999 | Pershan et al. | |
| 6,005,870 A | 12/1999 | Leung et al. | |
| 6,018,571 A | 1/2000 | Langlois et al. | |
| 6,018,737 A | 1/2000 | Shah et al. | |
| 6,021,428 A | 2/2000 | Miloslavsky | |
| 6,029,151 A | 2/2000 | Nikander | |
| 6,031,896 A | 2/2000 | Gardell et al. | |
| 6,041,103 A | 3/2000 | La Porta et al. | |
| 6,052,372 A | 4/2000 | Gittins et al. | |
| 6,058,163 A | 5/2000 | Pattison et al. | |
| 6,061,432 A | 5/2000 | Wallace et al. | |
| 6,092,102 A | 7/2000 | Lefeber et al. | |
| 6,100,882 A | 8/2000 | Sharman et al. | |
| 6,122,348 A | 9/2000 | French-St. George et al. | |
| 6,134,318 A | 10/2000 | O'Neil | |
| 6,134,548 A | 10/2000 | Gottsman et al. | |
| 6,144,671 A | 11/2000 | Perinpanathan et al. | |
| 6,154,646 A | 11/2000 | Tran et al. | |
| 6,161,008 A | 12/2000 | Lee et al. | |
| 6,163,692 A | 12/2000 | Chakrabarti et al. | |
| 6,167,119 A | 12/2000 | Bartholomew et al. | |
| 6,188,756 B1 | 2/2001 | Mashinsky | |
| 6,189,026 B1 | 2/2001 | Birrell et al. | |
| 6,192,123 B1 | 2/2001 | Grunsted et al. | 379/350 |
| 6,195,660 B1 | 2/2001 | Polnerow et al. | |
| 6,215,863 B1 | 4/2001 | Bennett et al. | |
| 6,219,413 B1 | 4/2001 | Burg | 379/215.01 |
| 6,226,374 B1 | 5/2001 | Howell et al. | 379/207 |
| 6,240,449 B1 | 5/2001 | Nadeau | |
| 6,260,050 B1 | 7/2001 | Yost et al. | |
| 6,275,575 B1 | 8/2001 | Wu | |
| 6,282,522 B1 | 8/2001 | Davis et al. | |
| 6,296,062 B1 | 10/2001 | Sundholm | |
| 6,298,129 B1 | 10/2001 | Culver et al. | |
| 6,301,338 B1 | 10/2001 | Makela et al. | |
| 6,301,609 B1 | 10/2001 | Aravamudan et al. | 709/207 |
| 6,310,947 B1 | 10/2001 | Polcyn | 379/211.01 |
| 6,324,269 B1 * | 11/2001 | Malik | 379/114.23 |
| 6,333,973 B1 | 12/2001 | Smith et al. | |
| 6,349,299 B1 | 2/2002 | Spencer et al. | |
| 6,351,279 B1 | 2/2002 | Sawyer | |
| 6,363,143 B1 | 3/2002 | Fox | |
| 6,371,484 B1 | 4/2002 | Yuan | |
| 6,373,930 B1 | 4/2002 | McConnell et al. | |
| 6,385,754 B1 | 5/2002 | Mizumoto et al. | |
| 6,389,113 B1 | 5/2002 | Silverman | |
| 6,408,191 B1 | 6/2002 | Blanchard et al. | |
| 6,408,327 B1 | 6/2002 | McClennon et al. | |
| 6,411,605 B1 | 6/2002 | Vance et al. | |
| 6,418,214 B1 | 7/2002 | Smythe et al. | |
| 6,430,176 B1 | 8/2002 | Christie | |
| 6,430,289 B1 | 8/2002 | Liffick | 379/900 |
| 6,434,226 B1 | 8/2002 | Takahashi | |
| 6,442,245 B1 | 8/2002 | Castagna et al. | |
| 6,442,251 B1 | 8/2002 | Maes et al. | |
| 6,442,748 B1 | 8/2002 | Bowman-Amuah | |
| 6,453,031 B2 | 9/2002 | Malik | |
| 6,453,167 B1 | 9/2002 | Michaels et al. | |
| 6,459,780 B1 | 10/2002 | Wurster et al. | 379/142.02 |
| 6,459,913 B2 | 10/2002 | Cloutier | |
| 6,463,145 B1 | 10/2002 | O'Neal et al. | |
| 6,463,464 B1 | 10/2002 | Lazaridis et al. | |
| 6,466,910 B1 | 10/2002 | Desmond et al. | |
| 6,470,079 B1 | 10/2002 | Benson | |
| 6,473,615 B1 | 10/2002 | Theppasandra et al. | |
| 6,477,374 B1 | 11/2002 | Shaffer et al. | 455/445 |
| 6,480,830 B1 | 11/2002 | Ford et al. | |
| 6,480,890 B1 | 11/2002 | Lee, Jr. et al. | |
| 6,507,644 B1 | 1/2003 | Henderson et al. | |
| 6,519,326 B1 | 2/2003 | Milewski et al. | |
| 6,522,734 B1 | 2/2003 | Allen et al. | |
| 6,526,134 B1 | 2/2003 | Wallenius | |
| 6,532,285 B1 | 3/2003 | Tucker et al. | |
| 6,535,596 B1 | 3/2003 | Frey et al. | |
| 6,539,082 B1 | 3/2003 | Lowe et al. | |
| 6,542,596 B1 | 4/2003 | Hill et al. | |
| 6,546,005 B1 | 4/2003 | Berkley et al. | 370/353 |
| 6,547,830 B1 | 4/2003 | Mercer | |
| 6,560,329 B1 | 5/2003 | Draginich et al. | |
| 6,563,914 B2 | 5/2003 | Sammon et al. | |
| 6,564,261 B1 | 5/2003 | Gudjonsson et al. | 709/227 |
| 6,574,324 B1 | 6/2003 | Malik | |
| 6,574,470 B1 | 6/2003 | Chow et al. | |
| 6,577,622 B1 | 6/2003 | Schuster et al. | 370/352 |
| 6,577,720 B1 | 6/2003 | Sutter | |
| 6,584,122 B1 | 6/2003 | Matthews et al. | 370/493 |
| 6,590,603 B2 | 7/2003 | Sheldon et al. | |
| 6,590,969 B1 | 7/2003 | Peters et al. | |
| 6,593,352 B2 | 7/2003 | Weichert et al. | |
| 6,594,470 B1 | 7/2003 | Barnes et al. | |
| 6,600,736 B1 | 7/2003 | Ball et al. | |
| 6,609,113 B1 | 8/2003 | O'Leary | |
| 6,611,590 B1 | 8/2003 | Lu et al. | |
| 6,614,786 B1 | 9/2003 | Byers | 370/353 |
| 6,618,710 B1 | 9/2003 | Zondervan et al. | |
| 6,625,258 B1 | 9/2003 | Ram et al. | |
| 6,628,194 B1 | 9/2003 | Hellebust et al. | |
| 6,628,770 B1 | 9/2003 | Jain et al. | |
| 6,636,587 B1 | 10/2003 | Nagai et al. | |
| 6,643,356 B1 | 11/2003 | Hickey et al. | |
| 6,654,768 B2 | 11/2003 | Celik | |
| 6,661,340 B1 | 12/2003 | Saylor et al. | |
| 6,665,388 B2 | 12/2003 | Bedingfield | |
| 6,668,046 B1 | 12/2003 | Albal | |
| 6,668,049 B1 | 12/2003 | Koch et al. | |
| 6,681,119 B1 | 1/2004 | Verdonk | |
| 6,683,939 B1 | 1/2004 | Chiloyan et al. | |
| 6,687,362 B1 | 2/2004 | Lindquist et al. | |
| 6,690,672 B1 | 2/2004 | Klein | |
| 6,693,897 B1 | 2/2004 | Huang | |
| 6,697,461 B1 | 2/2004 | Middleswarth et al. | |
| 6,697,796 B2 | 2/2004 | Kermani | |
| 6,704,294 B1 | 3/2004 | Cruickshank | |
| 6,711,158 B1 | 3/2004 | Kahane et al. | |
| 6,717,938 B1 | 4/2004 | D'Angelo | |
| 6,718,026 B1 | 4/2004 | Pershan et al. | |
| 6,718,178 B1 | 4/2004 | Miner et al. | |

| Patent No. | Date | Inventor(s) |
|---|---|---|
| 6,724,887 B1 | 4/2004 | Eilbacher et al. |
| 6,731,238 B2 | 5/2004 | Johnson |
| 6,735,292 B1 | 5/2004 | Johnson |
| 6,738,458 B1 | 5/2004 | Cline et al. |
| 6,747,970 B1 | 6/2004 | Lamb et al. |
| 6,748,054 B1 | 6/2004 | Gross et al. |
| 6,757,365 B1 | 6/2004 | Bogard |
| 6,768,788 B1 | 7/2004 | Langseth et al. |
| 6,768,790 B1 | 7/2004 | Manduley et al. |
| 6,771,949 B1 | 8/2004 | Corliss |
| 6,775,546 B1 | 8/2004 | Fuller |
| 6,788,772 B2 | 9/2004 | Barak et al. |
| 6,788,775 B1 | 9/2004 | Simpson |
| 6,792,092 B1 | 9/2004 | Michalewicz |
| 6,798,753 B1 | 9/2004 | Doganata et al. |
| 6,801,610 B1 | 10/2004 | Malik |
| 6,807,258 B1 * | 10/2004 | Malik ..................... 379/114.21 |
| 6,807,259 B1 | 10/2004 | Patel et al. |
| 6,816,468 B1 | 11/2004 | Cruickshank |
| 6,816,469 B1 | 11/2004 | Kung et al. |
| 6,820,055 B2 | 11/2004 | Saindon et al. |
| 6,842,460 B1 | 1/2005 | Olkkonen et al. |
| 6,847,823 B2 | 1/2005 | Lehikoinen et al. |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,876,736 B2 | 4/2005 | Lamy et al. |
| 6,882,714 B2 | 4/2005 | Mansfield |
| 6,882,838 B1 | 4/2005 | Lee et al. |
| 6,885,742 B1 | 4/2005 | Smith |
| 6,907,111 B1 | 6/2005 | Zhang et al. |
| 6,917,610 B1 | 7/2005 | Kung et al. |
| 6,944,279 B2 | 9/2005 | Elsey et al. |
| 6,947,538 B2 | 9/2005 | Shen et al. |
| 6,954,521 B2 | 10/2005 | Bull et al. |
| 6,956,942 B2 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,970,705 B2 | 11/2005 | Yoshimoto et al. |
| 6,996,227 B2 | 2/2006 | Albal et al. |
| 6,996,370 B2 | 2/2006 | DeLoye et al. |
| 6,999,563 B1 | 2/2006 | Thorpe et al. |
| 7,024,209 B1 | 4/2006 | Gress et al. |
| 7,027,435 B2 | 4/2006 | Bardehle |
| 7,031,437 B1 | 4/2006 | Parsons et al. |
| 7,043,521 B2 | 5/2006 | Eitel |
| 7,065,198 B2 | 6/2006 | Brown et al. |
| 7,068,768 B2 | 6/2006 | Barnes |
| 7,076,528 B2 | 7/2006 | Premutico |
| 7,107,312 B2 | 9/2006 | Hackbarth et al. |
| 7,116,972 B1 | 10/2006 | Zhang et al. |
| 7,130,390 B2 | 10/2006 | Abburi |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,174,306 B1 | 2/2007 | Haseltine |
| 7,181,417 B1 | 2/2007 | Langseth et al. |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al |
| 7,245,929 B2 | 7/2007 | Henderson et al. |
| 7,254,220 B1 | 8/2007 | Reding et al. |
| 7,283,808 B2 | 10/2007 | Castell et al. |
| 7,308,087 B2 | 12/2007 | Joyce et al. |
| 7,315,614 B2 | 1/2008 | Bedingfield, Sr. et al. |
| 7,379,538 B1 | 5/2008 | Ali et al. |
| 7,418,090 B2 | 8/2008 | Reding et al. |
| 7,428,580 B2 | 9/2008 | Hullfish et al. |
| 2001/0003202 A1 | 6/2001 | Mache et al. |
| 2001/0012286 A1 | 8/2001 | Huna et al. |
| 2001/0014863 A1 | 8/2001 | Williams, III |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1 | 11/2001 | Brachman et al. |
| 2001/0043689 A1 | 11/2001 | Malik |
| 2001/0043690 A1 | 11/2001 | Bakshi et al. |
| 2001/0051534 A1 | 12/2001 | Amin |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber et al. |
| 2002/0055351 A1 | 5/2002 | Elsey et al. |
| 2002/0057678 A1 | 5/2002 | Jiang et al. |
| 2002/0069060 A1 | 6/2002 | Cannavo et al. |
| 2002/0069096 A1 | 6/2002 | Lindoerfer et al. |
| 2002/0071539 A1 | 6/2002 | Diament et al. |
| 2002/0073163 A1 | 6/2002 | Churchill et al. |
| 2002/0075303 A1 | 6/2002 | Thompson et al. |
| 2002/0075306 A1 | 6/2002 | Thompson et al. |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper ................... 379/201.01 |
| 2002/0082028 A1 | 6/2002 | Wittenkamp |
| 2002/0082030 A1 | 6/2002 | Berndt et al. |
| 2002/0083462 A1 | 6/2002 | Arnott ........................ 348/14.08 |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0100798 A1 | 8/2002 | Farrugia et al. |
| 2002/0103864 A1 | 8/2002 | Rodman et al. |
| 2002/0103898 A1 | 8/2002 | Moyer et al. |
| 2002/0110121 A1 | 8/2002 | Mishra ......................... 370/389 |
| 2002/0115471 A1 | 8/2002 | DeLoye et al. |
| 2002/0137507 A1 | 9/2002 | Winkler |
| 2002/0137530 A1 | 9/2002 | Karve |
| 2002/0138468 A1 | 9/2002 | Kermani |
| 2002/0146105 A1 | 10/2002 | McIntyre |
| 2002/0147777 A1 | 10/2002 | Hackbarth et al. |
| 2002/0147811 A1 | 10/2002 | Schwartz et al. ............. 709/225 |
| 2002/0152165 A1 | 10/2002 | Dutta et al. |
| 2002/0168055 A1 | 11/2002 | Crockett et al. |
| 2002/0177410 A1 | 11/2002 | Klein et al. |
| 2002/0178117 A1 | 11/2002 | Maguire et al. |
| 2003/0014488 A1 | 1/2003 | Dalal et al. |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman et al. |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz ................... 370/352 |
| 2003/0069874 A1 | 4/2003 | Hertzog et al. |
| 2003/0083040 A1 | 5/2003 | Ruth et al. |
| 2003/0092451 A1 | 5/2003 | Holloway et al. |
| 2003/0093700 A1 | 5/2003 | Yoshimoto et al. |
| 2003/0096626 A1 | 5/2003 | Sabo et al. |
| 2003/0097635 A1 | 5/2003 | Giannetti |
| 2003/0104827 A1 | 6/2003 | Moran et al. |
| 2003/0108172 A1 | 6/2003 | Petty et al. |
| 2003/0112928 A1 | 6/2003 | Brown et al. |
| 2003/0119532 A1 | 6/2003 | Hatch |
| 2003/0140014 A1 | 7/2003 | O'Leary et al. |
| 2003/0142798 A1 | 7/2003 | Gavette et al. |
| 2003/0147518 A1 | 8/2003 | Albal et al. |
| 2003/0149662 A1 | 8/2003 | Shore |
| 2003/0158860 A1 | 8/2003 | Caughey |
| 2003/0165223 A1 | 9/2003 | Timmins et al. |
| 2003/0167229 A1 | 9/2003 | Ludwig et al. |
| 2003/0169330 A1 | 9/2003 | Ben-Shachar et al. |
| 2003/0179743 A1 | 9/2003 | Bosik et al. |
| 2003/0179864 A1 | 9/2003 | Stillman et al. |
| 2003/0187992 A1 | 10/2003 | Steenfeldt et al. |
| 2003/0208541 A1 | 11/2003 | Musa |
| 2003/0217097 A1 | 11/2003 | Eitel |

| | | | | | |
|---|---|---|---|---|---|
| 2003/0228863 A1 | 12/2003 | Vander Veen et al. | JP | 2001-156921 | 6/2001 |
| 2004/0002350 A1 | 1/2004 | Gopinath et al. | JP | 2001-197210 | 7/2001 |
| 2004/0019638 A1 | 1/2004 | Makagon et al. ............ 709/204 | JP | 2001-197562 | 7/2001 |
| 2004/0034700 A1 | 2/2004 | Polcyn | JP | 2001-298545 | 10/2001 |
| 2004/0044658 A1 | 3/2004 | Crabtree et al. | JP | 2002-016673 | 1/2002 |
| 2004/0052356 A1 | 3/2004 | McKinzie et al. | JP | 2002-044257 | 2/2002 |
| 2004/0081292 A1 | 4/2004 | Brown et al. | JP | 2002-157807 | 2/2002 |
| 2004/0103152 A1 | 5/2004 | Ludwig et al. | JP | 2002-232575 | 8/2002 |
| 2004/0119814 A1 | 6/2004 | Clisham et al. | JP | 2002-237893 | 8/2002 |
| 2004/0127256 A1 | 7/2004 | Goldthwaite et al. | JP | 2002-247148 | 8/2002 |
| 2004/0156491 A1 | 8/2004 | Reding et al. | JP | 2002-261834 | 9/2002 |
| 2004/0184593 A1 | 9/2004 | Elsey et al. | JP | 2002-300290 | 10/2002 |
| 2004/0203942 A1 | 10/2004 | Dehlin | JP | 2002-300306 | 10/2002 |
| 2004/0208305 A1 | 10/2004 | Gross et al. | WO | 96/14704 | 5/1996 |
| 2004/0236792 A1 | 11/2004 | Celik | WO | 99/38309 | 7/1999 |
| 2004/0247088 A1* | 12/2004 | Lee ........................... 379/88.01 | WO | 00/45557 | 8/2000 |
| 2004/0249884 A1 | 12/2004 | Caspi et al. | WO | 001064133 | 10/2000 |
| 2004/0264654 A1 | 12/2004 | Reding et al. | WO | WO01/11586 | 2/2001 |
| 2005/0053221 A1 | 3/2005 | Reding et al. | WO | WO 01/11586 A1 | 2/2001 |
| 2005/0102382 A1 | 5/2005 | MacGregor et al. | WO | WO 01/35621 | 5/2001 |
| 2005/0129208 A1 | 6/2005 | McGrath et al. | WO | 011052513 | 7/2001 |
| 2005/0149487 A1 | 7/2005 | Celik | WO | WO 01/89212 | 11/2001 |
| 2005/0191994 A1 | 9/2005 | May et al. | | | |
| 2005/0216421 A1 | 9/2005 | Barry et al. | | | |
| 2005/0220286 A1 | 10/2005 | Valdez et al. | | | |
| 2005/0243993 A1 | 11/2005 | McKinzie et al. | | | |
| 2006/0093120 A1 | 5/2006 | Thorpe et al. | | | |
| 2006/0095575 A1 | 5/2006 | Sureka et al. | | | |
| 2006/0168140 A1 | 7/2006 | Inoue et al. | | | |
| 2006/0276179 A1 | 12/2006 | Ghaffari et al. | | | |
| 2006/0277213 A1 | 12/2006 | Robertson et al. | | | |
| 2007/0021111 A1 | 1/2007 | Celik | | | |

FOREIGN PATENT DOCUMENTS

| | | |
|---|---|---|
| DE | 10110942 | 9/2002 |
| DE | 10255489 A1 | 6/2004 |
| EP | 0818908 | 1/1998 |
| EP | 0818908 A3 | 1/1998 |
| EP | 1028578 | 8/2000 |
| EP | 1161063 | 12/2001 |
| EP | 1193617 | 3/2002 |
| EP | 1235387 | 8/2002 |
| JP | 59-169264 | 9/1984 |
| JP | 02260750 | 10/1990 |
| JP | 04-336742 | 11/1992 |
| JP | 05-316233 | 11/1993 |
| JP | 07-030664 | 1/1995 |
| JP | 07-058856 | 3/1995 |
| JP | 07-107171 | 4/1995 |
| JP | 07-107549 | 4/1995 |
| JP | 07-123098 | 5/1995 |
| JP | 08-149226 | 6/1996 |
| JP | 08-181763 | 7/1996 |
| JP | 08-298546 | 11/1996 |
| JP | 09-064869 | 3/1997 |
| JP | 09-064977 | 3/1997 |
| JP | 09-083651 | 3/1997 |
| JP | 09-200350 | 7/1997 |
| JP | 09-223087 | 8/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000-224301 | 8/2000 |
| JP | 2000-270307 | 9/2000 |
| JP | 2001-144859 | 5/2001 |

OTHER PUBLICATIONS

Komowski, J., "Wildfire at Your Back and Call-A Voice-Activated Telephone Assistant That Minds You and Your Messages", http://www.iacha.org/lalawyer/techwildfire.html, pronted Oct. 1, 2004.

Cisco Personal Assistant 1.4, Cisco Systems, Jun. 24, 2003, http://www.cisco.com/en/US/products/sw/voicesw/ps2026/prod_presentation_list.html, printed Oct. 1, 2004.

"MP3 Recorder Download—MP3 Recorder—Record Audio Stream to MP3 or WAV," 2002, http://www.mp3-recorder.net.

"FAQ Premium Home Answer" eVoice, http://content.evoice.com/wcs/signUp/FAQ_premHA_s01.htm.

"Voice-ASP, White Paper Technology & Processes," eVoice, Dec. 13, 2000.

"Voice-ASP, White Paper: Market Opportunities for Enhanced Voicemail," eVoice, Nov. 10, 2000.

"Audio Digitizing Process," TalkBank, http://www.talkbank.org/da/audiodig.html.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Macromedia SoundEdit 16 Support Center-Working with Other Programs, What is Shockwave Audio Streaming?" http://www.macromedia.com/support/soundedit/how/shock/whatis.html.

"Chapter 3: Overview," last updated Dec. 2, 1999, http://service.real.com/help/library/guides/g270/htmfiles/overview.htm.

"How Internet Radio Works," Howstuffworks, http://computer.howstuffworks.com/internet-radio.htm/printable.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"Real-Time Collaboration Integration in the Portal," T. Odenwald, SAP Design Guild, http://www.sapdesignguild.org/editions/edition5/synch_collab.asp.

"NetMeeting101," http://www.meetingbywire.com/NetMeeting101.htm.

"NetMeeting102," http://www.meetingbywire.com/NetMeeting102.htm.

"Instructions on Application Sharing and Data Collaboration," VCON Escort and Cruiser, http://www.vide.gatech.edu/docs/share.

"Instructions on Multipoint Application Sharing and Data Collaboration," VCON Escort and Cruiser with the RadVision MCU, http://www.vide.gatech.edu/docs/multi-share/.

Data Connection, Strategic Software Technology, "DC-WebShare," Data Connection Ltd, 1998-2000, http://web.archive.org/web/20001016115016/www.dataconnection.com/conf/webshare.htm.

Data Connection, Strategic Computer Technology, "DC-Recorder," Data Connection Ltd, 1998-2000, http://web.archive.org/web/20001016055611/www.dataconnection.com/conf/recorder.htm.

Data Connection, Strategic Software Technology, "DC-MeetingServer," Data Connection Ltd, 1998-2000, http://web.archive.org/web/20000914200719/www.dataconnection.com/conf/meetingserver/htm.
Data Connection, Strategic Computer Technology, "DC-MeetingServer," Data Connection Ltd, 1998-2000, http://web.archive.org/web/20021201144529/www.dataconnection.com/inetapps/conferencing.htm.
Data Connection, Strategic Software Technology, "DC-VoiceNet Features," Data Connection Ltd, 1998-2000, http://web.archive.org/web/20001016102614/www.dataconnection.com/messging/vnfeat.htm.
Data Connection, Strategic Software Technology, "DC-VoiceNet," Data Connection Ltd, 1998-2000, http://web.archive.org/web/20000914200424/www.dataconnection.com/messging/vnet.htm.
Data Connection, Strategic Computer Technology, "Messaging Software Products and Services," Data Connection Ltd, 1998-2000, http://web.archive.org/web/20010305143803/www.dataconnection.com/messging/messgidx.htm.
Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.
Data Connection, "SmartDialer Functional Overview," Version v1.0, Internet Applications Group, Data Connection Ltd., Nov. 3, 2003.
Data Connection, "SIP Market Overview, An analysis of SIP technology and the state of the SIP Market," Jonathan Cumming, Data Connection Ltd., 2003-2004.
Data Connection, "Integrating Voicemail Systems, A white paper describing the integration of heterogeneous voicemail systems," Michael James, Internet Applications Group, Data Connection Ltd., 2004.
Data Connection, Strategic Computer Technology, "MailNGen: Next generation messaging for Service Providers," Data Connection Ltd, 1998-2004, http://www.dataconnection.com/messaging/.
Data Connection, Strategic Computer Technology, "MailNGen: Unified Messaging," Data Connection Ltd, 1998-2004, http://www.dataconnection.com/messaging/unified_messaging.htm.
Data Connection, Strategic Computer Technology, "MeetingServer: The award-winning web conferencing solution for Service Providers," Data Connection Ltd, 1998-2005, http://www.dataconnection.com/conferencing/.
Data Connection, Strategic Computer Technology, "MeetingServer: The web conferencing solution for Service Providers," Data Connection Ltd, 1998-2004, http://www.dataconnection.com/conferencing/meetingserver.htm.
"File Transfer," Microsoft Windows Technologies Windows NetMeeting, last updated Jun. 4, 1999, http://www.microsoft.com/windows/netmeeting/features/files/default.asp.
"From Dial Tone to Media Tone," Analyst: R. Mahowald, IDC, Jun. 2002.
"MediaTone—The 'Dial Tone' for Web Communications Services," Webex, 2003.
Business Solutions/Professional, http://www.accessline.com/business_sol/bs_professional_body.html.
"Accessline Comms' Accessline Service, The One-Number Wonder," *CommWeb*, T. Kramer, Feb. 1, 2000, http://www.cconvergence.com/article/TCM20000504S0014.
"InteleScreener," 2003, http://www.intelescreener.com/howitworks.html.
"TeleZapper from Privacy Technologies," Privacy Corps—Our Review, 2002, http://www.privacycorps.com/pages/product1.htm.
"A Proposal for Internet Call Waiting Service Using SIP," A. Brusilovsky et al., Lucent Technologies, PINT Working Group, Internet Draft, Jan. 1999.
"A Model for Presence and Instant Messaging," M. Day et al., Fujitsu, Feb. 2000, Network Working Group, Request for Comments 2778.
Data Connection, Strategic Computer Technology, MeetingServer, "Broadband for Learning Case Study," Data Connection Ltd, 1998-2004, http://www.dataconnection.com/conferencing/meetingserver_casestudy.htm.
Data Connections, MailNGen, "Next Generation Messaging for Service Providers," Data Connection Limited, 2003-4.
Data Connection, Strategic Computer Technology, "Directories Explained," Data Connection Ltd, 1998-2004, http://www.dataconnection.com/inetapps/direxpl.htm.
Data Connection, Strategic Computer Technology, Directory Systems, "Directories and Meta-Directories," Data Connection Ltd, 1998-2004, http://www.dataconnection.com/inetapps/directory.htm.
Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.
Data Connection, Strategic Software Technology, "DC-SurroundSuite for Service Providers," Data Connection Ltd, 1998-2000, http://web.archive.org/web/20000914200355/www.dataconnection.com/messging/spssuite.htm.
Data Connection, Strategic Computer Technology, "Messaging Software Products and Services," Data Connection Ltd, 1998-2000, http://web.archive.org/web/20000819063320/www.dataconnection.com/messging/messgidx.htm.
Data Connection, Strategic Software Technology, "DC-Share for UNIX," Data Connection Ltd, 1998-2000, http://web.archive.org/web/20000914200713/www.dataconnection.com/conf/DCshare.htm.
Data Connection, Strategic Software Technology, "DC-H.323," Data Connection Ltd, 1998-2000, http://web.archive.org/web/20001120050600/www.dataconnection.com/conf/h323.htm.
Data Connection, Strategic Computer Technology, "MeetingServer: Web conferencing architecture," Data Connection Ltd, 1998-2004, http://www.dataconnection.com/conferencing/meetingserver_arch.htm.
"MP3 Recorder Download—MP3 Recorder—Record Audio Stream to MP3 or WAV," 2002 http://www.mp3-recorder.net.
"FAQ Premium Home Answer" eVoice, http://content.evoice.com/wcs/signUp/FAQ_premHA_s01.htm.
"Voice-ASP, White Paper Technology & Processes," eVoice, Dec. 13, 2000.
"Voice-ASP, White Paper: Market Opportunities for Enhanced Voicemail," eVoice, Nov. 10, 2000.
"Audio Digitizing Process," TalkBank, http://www.talkbank.org/da/audiodig.html.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
"Macromedia SoundEdit 16 Support Center-Working with Other Programs, What is Shockwave Audio Streaming?" http://www.macromedia.com/support/soundedit/how/shock/whatis.html.
"Chapter 3: Overview," last updated Dec. 2, 1999, http://service.real.com/help/library/guides/g270/htmfiles/overview.htm.
U.S. Appl. No. 09/828,679, filed Apr. 6, 2001, Reding et al.
U.S. Appl. No. 09/785,223, filed Feb. 16, 2001, Swingle et al.
"How Internet Radio Works," Howstuffworks, http://computer.howstuffworks.com/internet-radio.htm/printable.
"Telecommunications and Personal Management Services Linked in Collaboration by Verizon and Microsoft," Oct. 23, 2001, http://www.microsoft.com/presspass/press/2001/oct01/10-23MSVerizonPr.asp.
"Real-Time Collaboration Integration in the Portal," T. Odenwald, SAP Design Guild, http://www.sapdesignguild.org/editions/edition5/synch_collab.asp.
"Instructions on Application Sharing and Data Collaboration," VCON Escort and Cruiser, http://www.vide.gatech.edu/docs/share.
"Instructions on Multipoint Application Sharing and Data Collaboration," VCON Escort and Cruiser with the RadVision MCU, http://www.vide.gatech.edu/docs/multi-share/.
"File Transfer," Microsoft Windows Technologies Windows NetMeeting, last updated Jun. 4, 1999, http://www.microsoft.com/windows/netmeeting/features/files/default.asp.
"From Dial Tone to Media Tone," Analyst: R. Mahowald, IDC, Jun. 2002.
"MediaTone—The 'Dial Tone' for Web Communications Services," Webex, 2003.
Business Solutions/Professional, http://www.accessline.com/business_sol/bs_professional_body.html.

"Accessline Comms' Accessline Service, The One-Number Wonder," *CommWeb*, T. Kramer, Feb. 1, 2000, http://www.cconvergence.com/article/TCM20000504S0014.

"InteleScreener," 2003, http://www.intelescreener.com/howitworks.html.

"TeleZapper from Privacy Technologies," Privacy Corps—Our Review, 2002, http://www.privacycorps.com/pages/product1.htm.

"A Proposal for Internet Call Waiting Service Using SIP," A. Brusilovsky et al., Lucent Technologies, PINT Working Group, Internet Draft, Jan. 1999.

"A Model for Presence and Instant Messaging", M. Day, et al. Fujitsu, Feb. 2000, Network Working Group, Request for Comments 2778.

White "How Computers Work" Millennium Edition 1999 Que Corporation Indianapolis IN all pages.

Derfler "How Networks Work" Bestseller Edition 1996 Ziff-Davis Press Emeryville CA all pages.

Gralla "How the Internet Works" Millennium Edition 1999 Que Corporation Indianapolis IN all pages.

Muller "Desktop Encyclopedia of the Internet" 1999 Artech House Inc. Norwood MA all pages.

"Calendar Scheduling Teleconference Communication Mechanism," IBM Technical Disclosure Bulletin, IBM Corp. New York, US, vol. 37, No. 3, Mar. 1, 1994, p. 561.

White, "How Computers Work," Millenium Edition, Sep. 1999, Que Corporation, pp. vi-xi, 135-184, 399-421.

Derfler et al., "How Networks Work, " Bestseller Edition, 1996, Ziff-Davis Press, pp. vi-ix, 1-3, 21-70, 190-198.

Gralla, "How the Internet Works," Ziff Davis Press, 1999, pp. vi-xi, 8-11, 308-324.

Mueller, "Desktop Encyclopedia of the Internet," Artech House Inc., 1999, pp. v-xiv, 233-246, 539-559.

\* cited by examiner

METHODS AND SYSTEMS FOR REMOTE CALL ESTABLISHMENT

RELATED APPLICATIONS

Applicants claim the right to priority under 35 U.S.C. § 119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/083,792, entitled "VOICE MAIL INTEGRATION WITH INSTANT MESSENGER," filed Feb. 27, 2002; U.S. patent application Ser. No. 10/083,884, entitled "DEVICE INDEPENDENT CALLER ID," filed Feb. 27, 2002; and U.S. patent application Ser. No. 10/083,822, entitled "METHOD AND APPARATUS FOR A UNIFIED COMMUNICATION MANAGEMENT VIA INSTANT MESSAGING," filed Feb. 27, 2002; U.S. patent application Ser. No. 10/083,793, entitled "METHOD AND APPARATUS FOR CALENDARED COMMUNICATIONS FLOW CONTROL," filed Feb. 27, 2002; U.S. patent application Ser. No. 10/084,121, entitled "CALENDAR-BASED CALLING AGENTS," filed Feb. 27, 2002; U.S. patent application Ser. No. 10/720,661, entitled "METHODS AND SYSTEMS FOR DRAG AND DROP CONFERENCE CALLING," U.S. patent application Ser. No. 10/720,859, entitled "METHODS AND SYSTEMS FOR CONFERENCE CALL BUFFERING," U.S. patent application Ser. No. 10/721,009, entitled "METHODS AND SYSTEMS FOR COMPUTER ENHANCED CONFERENCE CALLING," U.S. patent application Ser. No. 10/721,005, entitled "METHODS AND SYSTEMS FOR CALL MANAGEMENT WITH USER INTERVENTION," U.S. patent application Ser. No. 10/720,868, entitled "METHODS AND SYSTEMS FOR DIRECTORY INFORMATION LOOKUP," U.S. patent application Ser. No. 10/720,970, entitled "METHODS AND SYSTEMS FOR AUTOMATIC COMMUNICATION LINE MANAGEMENT BASED ON DEVICE LOCATION," U.S. patent application Ser. No. 10/720,952, entitled "METHODS AND SYSTEMS FOR ADAPTIVE MESSAGE AND CALL NOTIFICATION," U.S. patent application Ser. No. 10/720,870, entitled "METHODS AND SYSTEMS FOR A CALL LOG," U.S. patent application Ser. No. 10/720,633, entitled "METHODS AND SYSTEMS FOR AUTOMATIC FORWARDING OF CALLS TO A PREFERRED DEVICE," U.S. patent application Ser. No. 10/720,971, entitled "METHODS AND SYSTEMS FOR LINE MANAGEMENT," U.S. patent application Ser. No. 10/720,784, entitled "METHODS AND SYSTEMS FOR CONTACT MANAGEMENT," U.S. patent application Ser. No. 10/720,920, entitled "METHODS AND SYSTEMS FOR NOTIFICATION OF CALL TO PHONE DEVICE," U.S. patent application Ser. No. 10/720,825, entitled "METHODS AND SYSTEMS FOR SINGLE NUMBER TEXT MESSAGING," U.S. patent application Ser. No. 10/720,944, entitled "METHODS AND SYSTEMS FOR MULTI-USER SELECTIVE NOTIFICATION," U.S. patent application Ser. No. 10/720,933, entitled "METHODS AND SYSTEMS FOR CPN TRIGGERED COLLABORATION," and U.S. patent application Ser. No. 10/720,938, entitled "METHODS AND SYSTEMS FOR PREEMPTIVE REJECTION OF CALLS," all of which are expressly incorporated herein by reference in their entirety.

FIELD OF THE INVENTION

The present invention relates generally to communications systems and, more particularly, to methods and systems for remote establishment of calls.

BACKGROUND OF THE INVENTION

Telephone systems have become an important aspect of modern day life. Presently various mechanisms exist for customers to make calls when away from their home telephone such that these calls are billed to either their account, the called party, or to a third party.

For example, if the user is away from their home phone and has a calling card, the user may use a payphone to place the call and have it billed to their calling card. For example, the user may place a call to a specific number associated with the calling card that is then transferred to a calling card center. In certain cases, a calling card company may have multiple such centers throughout the United States, in which case the call is typically transferred to a regional calling card center in the same region as the calling party. Alternatively, the call may be transferred to a computer connected to the switch that provides calling card type services. The calling card center or switch then prompts the user to enter the number they are calling and then their calling card number. Typically, the calling number is the user's home phone number plus a four-digit personal identification number (PIN). The call is then forwarded from the calling card center to the number they entered and the caller is appropriately billed.

In another example, a user may purchase a prepaid calling card. Use of this card is essentially the same as described above, with the exception that rather than billing the user after the call, the costs of the call are deducted from the prepaid amount of the calling card until the amount remaining on the card becomes zero. Although billing procedures are simplified, this system requires a separate retail transaction prior to placing the call.

In another example, a user away from their home can make a collect call such that the call is billed to the called party. For example, the user can dial a specific number for obtaining collect call services. This call is then transferred to an appropriate data center or computer device that prompts the user to enter the number they are calling. A call is then placed to the number they are calling. If answered, the answering party is asked whether they will accept charges for the call. If so, the center connects the calling and called parties and the called party is later billed for the call. This system, however, requires action by the called party before the call can proceed.

In yet another example, the user may place a call to an operator. The user is then connected to the operator, and the user provides the operator with the number they are calling plus information regarding whom to bill (e.g., the called party, the user's account, or a third party). The operator then verifies the billing information (e.g. verifies that the party to be billed will accept the charges). The operator then connects the calling and called party. This, however, imposes personnel costs associated with employing live operators.

Accordingly, it would be desirable for improved methods and systems for remote establishment of calls.

SUMMARY OF THE INVENTION

In accordance with the purposes of the invention, as embodied and broadly described herein, methods and systems are provided for establishing of a call from a first device to a second device. In one embodiment, the methods and systems include receiving a call placed by a user from the first device, receiving from the first device information regarding the second device to which the call is to be placed, receiving from the first device information regarding a third device, wherein the third device is associated with the user, transferring the call to a first switch associated with the third device, transferring the call from the first switch to a second switch using the information received from the first device, the second switch associated with the second device, and transferring the call from the second switch to the second device.

In another aspect, the invention comprises methods and systems for a system for establishment of a call from a first device to a second device via a communication network, including a first switch for receiving a call placed by a user from a first device, a set of one or more processors for receiving from the first device information regarding a second device to which the call is to be placed and receiving from the first device information regarding a third device, wherein the third device is associated with the user, a second switch associated with the second device for receiving the call and transferring the call to the second device, and a third switch for receiving the call from the first switch and transferring the call to the second switch using the information received from the first device.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

The following will provide a description of methods and systems consistent with the invention of an embodiment for enabling a user to place a call from any telephone, and have the call billed to the user's primary telephone number (e.g., their home phone). In such an embodiment, the call may be routed to the service switching point (SSP) servicing the user's home phone (phone to be billed). The SSP may then forward the call to the called number.

Figure 1:
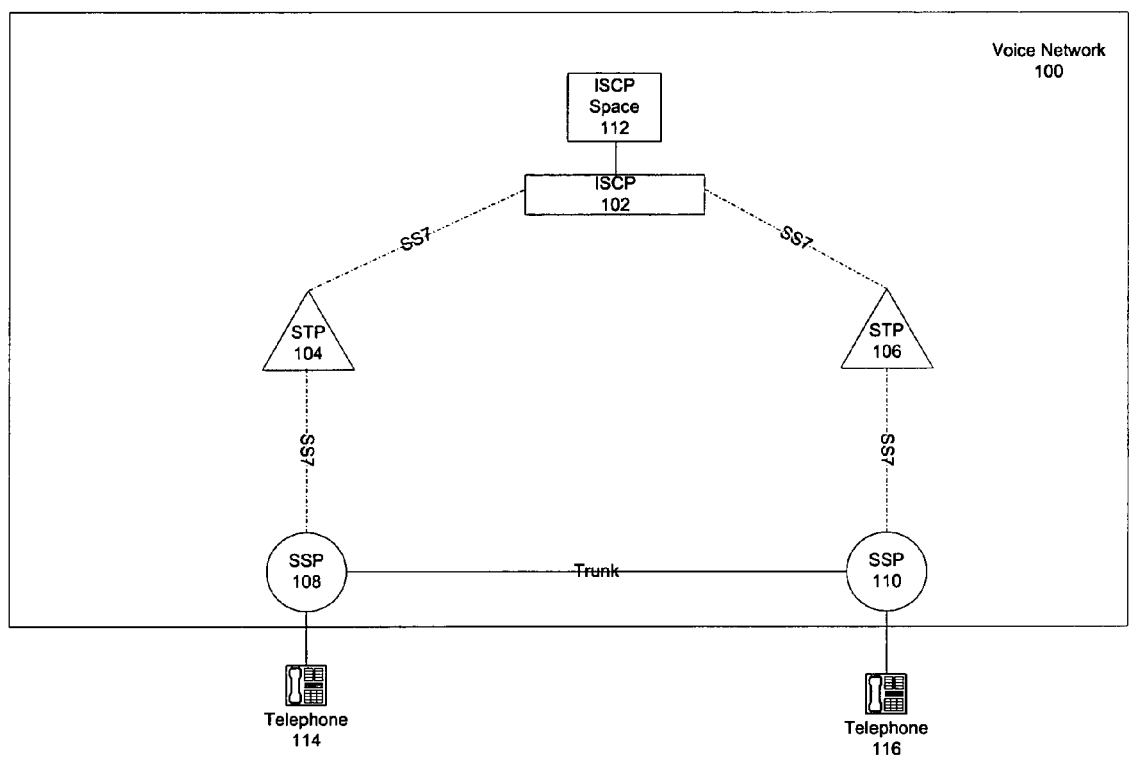
FIG. 1 provides a simplified diagram of a voice network, in accordance with methods and systems consistent with the invention.

FIG. 1 provides a simplified diagram of a voice network 100, in accordance with methods and systems consistent with the invention. As shown, voice network 100 includes an intelligent service control point (ISCP) 102, service transfer points (STP) 104 and 106, service switching points (SSP) 108 and 110, and an ISCP Service Provisioning And Creation Environment (SPACE) 114. Although in this embodiment voice network 100 is described as a Public Switched Telephone Network (PSTN), voice network 100 may be, for example, a voice or video over broadband network, a wireless broadband network, a wireless voice network, etc.

Voice network 100 may be implemented using PSTN and SS7 as a signaling protocol. SS7 protocol allows voice network 100 to provide features, such as call forwarding, caller-ID, three-way calling, wireless services such as roaming and mobile subscriber authentication, local number portability, and toll-free/toll services. The SS7 protocol provides various types of messages to support the features of voice network 100. For example, these SS7 messages may include Transaction Capabilities Applications Part ("TCAP") messages to support event "triggers," and queries and responses between ISCP 102 and SSPs 108 and 110.

ISCP 302 may also be, for example, a standard service control point (SCP), an Advanced Intelligent Network (AIN) SCP, a soft switch, or any other network call controller. As used herein, the term service control point (SCP) is a generic term that covers standard SCPs, ISCPs and AIN SCPs. ISCP 102 provides translation and routing services of SS7 messages to support the features of voice network 100, such as call forwarding. In addition, ISCP 102 may exchange information with the service center 106 using TCP/IP or SS7. ISCP 102 may be implemented using a combination of known hardware and software. ISCP 102 is shown with both a direct connection to service center 106 and a connection through ISCP SPACE 114, however, any number of network elements including routers, switches, hubs, etc., may be used to connect ISCP 102, ISCP SPACE 114, and service center 106. Further, information exchanged between the ISCP 102 and service center 106 may use, for example, the SR-3389 General Data Interface (GDI) for TCP/IP.

STPs 104 and 106 relay SS7 messages within voice network 100. For example, STP 104 may route SS7 messages between SSPs 108 and 110. STP 102 may be implemented using known hardware and software from manufacturers such as NORTEL™ and LUCENT Technologies™.

SSPs 108 and 110 provide an interface between voice network 100 and phones 114 and 120, respectively, to setup, manage, and release telephone calls within voice network 100. SSPs 108 and 110 may be implemented as a voice switch, an SS7 switch, or a computer connected to a switch. SSPs are also often referred to as Central Office (CO) switches, and the terms are used herein interchangeably. SSPs 108 and 110 exchange SS7 signal units to support a telephone call between calling party 120 and user 110. For example, SSPs 108 and 110 may exchange SS7 messages, such as TCAP messages, within message signal units ("MSU") to control calls, perform database queries to configuration database 112, and provide maintenance information.

Figure 2:
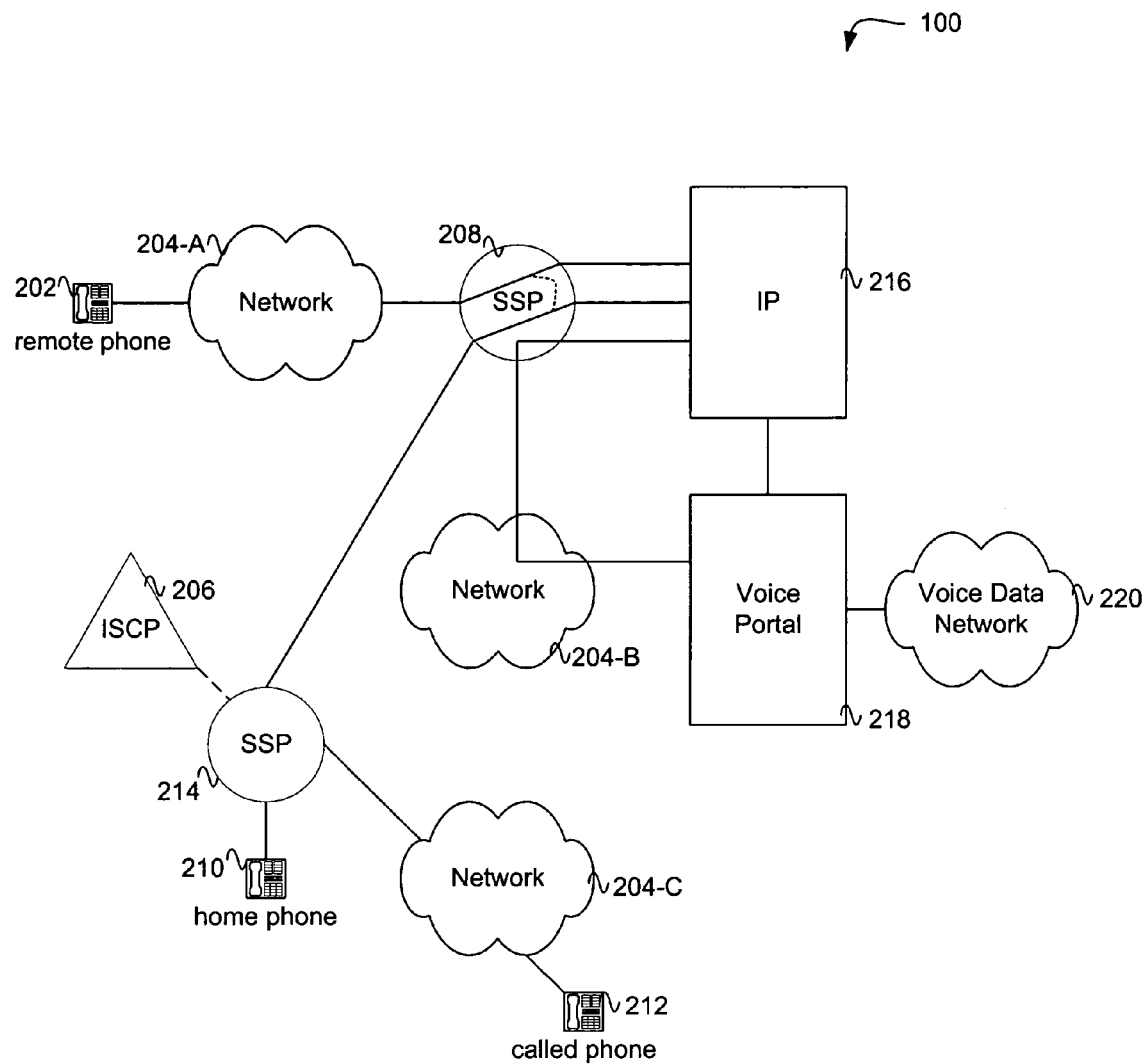
FIG. 2 illustrates an exemplary logical diagram of a voice network 100, in accordance with methods and systems consistent with the invention.

FIG. 2 illustrates an exemplary logical diagram of a voice network 100, in accordance with methods and systems consistent with the invention, and will be used below to explain exemplary methods and systems for permitting a user to make a call from a remote location. As illustrated, the system includes a remote phone 202, a network 204, an Intelligent Service Control Point (ISCP) 206, a Service Switching Point (SSP) 208, a home phone 210, a called party's phone 212, and an SSP 214. Although the network 204 is illustrated as three separate clouds 204-A, 204-B, and 204-C, one of skill in the art would understand that these all may be the same network and that all may be part of the voice network 100 and, as such, include additional SSPs, STPs, ISCPs, etc. Further, although not illustrated, as discussed above, one or more Signal Transport Points (STPs) may connect SSP 214 with ISCP 210.

Further illustrated is an Intelligent Peripheral (IP) 216 connected, via SSP 208, to SSP 214. IP 216 may be, for example, any type of commercially available IP, such as those available from Cognitronics and IBM. Also illustrated is a voice portal 218 that may include a voice recognition function that can receive and interpret dictation or recognize spoken commands. Voice portal 218 may interface with a data center in a voice data network 220, which may be used for billing purposes.

Figure 3:
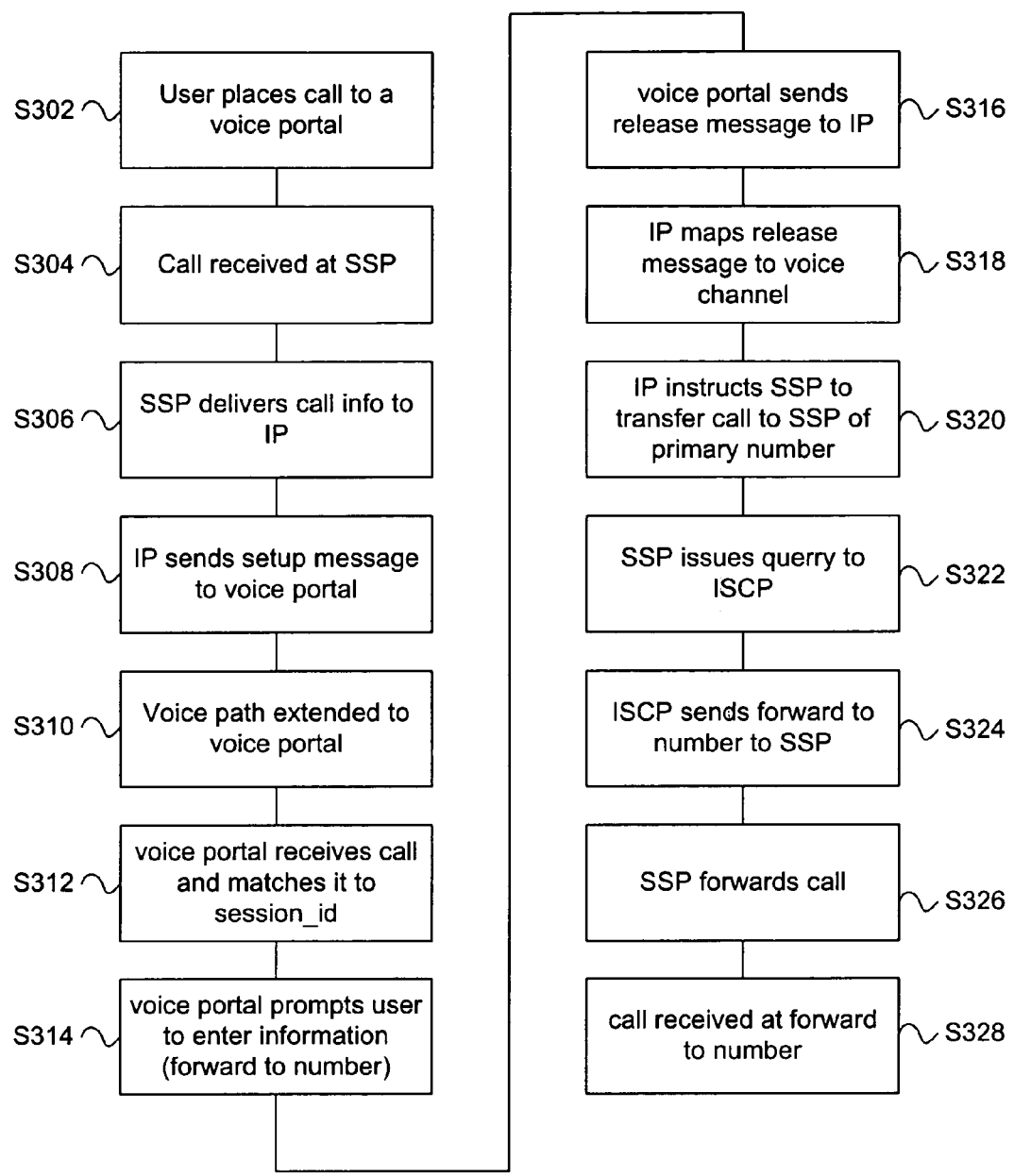
FIG. 3 illustrates a flow chart for a method for establishing a call from a remote location, in accordance with methods and systems consistent with the invention.

FIG. 3 illustrates a flow chart for a method for establishing a call from a remote location, in accordance with methods and systems consistent with the invention, that will described in conjunction with FIG. 2. As used herein, the term "call" refers to a communications session between two or more end points.

A user may initiate a call from remote phone 202 by first placing a call to a voice portal number (S302). As used herein the term "place a call" means the user initiating a communications session between the user's device and one or more other devices. This number may be, for example, a specific number advertised for providing this service, and may be, for example, a 1-800 type number.

Network 204-A (FIG. 2) then receives the call and transfers the call to SSP 208 using the dialed number (S304). SSP 208 may be, for example, located in the local access and transport area (LATA) where service is provided to the user's home phone 210.

The call is then received at SSP 208 which recognizes the dialed number as one for remote call establishment. SSP 208 then provides signaling information to IP 216 using a protocol, such as, for example, Primary Rate Interface (PRI) signaling (S306).

IP 216 may also, in response to the dialed number, invoke an appropriate software application. This application may, for example, assign a 10-digit session_id for this call and log Calling Party information received in a setup message as part of PRI protocal. This Calling Party information may include the Called Party's Number (CPN), Nature of Number, and Presentation Restriction Indicator. In this example, the CPN is the number dialed out by the user to obtain this service (i.e., the 1-800 number), the Nature of Number is an indication of whether the dialed number is a domestic or international number and the Presentation Restriction Indicator is an indication of whether the number from which the call was placed is unlisted or specifies that caller-ID information is not to be displayed.

The session_id may be used for identification/tracking purposes and include a unique IP id number for identifying IP 216, and a session number for identifying the session between IP 216 and voice portal 218. For example, in an embodiment, the session_id may be a ten digit number that includes a six digit IP id number (NPA-XXX) and a four digit session number (YYYY) for identifying the session within IP 216. Additionally, in this embodiment, each IP may have up to 1,000 simultaneous sessions active with Voice Portal 218.

The application of IP 216 may then send a setup message to the Voice Portal 218. (S308). This setup message may be sent, for example, over a TCP/IP connection. This message may contain, for example, the 10-digit session_id number.

The application of IP 216 may also extend the voice path of the call to the Voice Portal 218. (S310). That is, the IP 216 may direct the SSP 208 to transfer the call back through the network 204-B to the Voice Portal 218. The application of IP 216 may populate the CPN for this call with the session_id sent to it in the TCP/IP Setup Message.

Next, the call arrives at the Voice Portal 218. Voice Portal 218, a software application then matches the CPN to a pending session_id. This indicates that special handling is required for this call. (S312).

The Voice Portal 218 then may play a voice recording indicating to the user that the call has been received and prompting the user to enter the number they wish to call. (S314). Additionally, the user may be prompted to enter a primary number (i.e., the number associated with their home phone 210) along with a Personal Identification Number (PIN). The user may provide the requested information by, for example, speech or by entering it using a keypad on their phone. The Voice Portal 218 may then send the user's primary number and PIN to the voice network's data center 220 to verify that the user is authorized to bill the call to the primary number. If the PIN entered by the user is not recognized, the Voice Portal 218 may ask that the user reenter this information, or play a message that they should try again later.

After the user provides the number they wish to call, the Voice Portal 218 may send a TCP/IP Release Message instructing the IP 216 to drop the call to the Voice Portal 218 and forward the call to the user's primary number (e.g., the number associated with the user's home phone 210). (S318). This Release Message may contain, for example, a Forward-To Number (the 10-digit Number the user wishes to call), the user's Primary Number (the 10-digit Number associated with the user's home phone 210), and the session_id. The IP 216 may then use the session_id in the Release Message to map the release message to appropriate voice channels. (S318).

In one example, the IP 216 may send a PRI setup message to the SSP 208 to cause the call to the Voice Portal 218 to be dropped and a new call established to the SSP 214 associated with user's Primary Number (i.e., home phone 210). This PRI setup message may contain the following: a unique CPN, which may be used by the service logic of the ISCP 206 to invoke the Voice Portal's 218 service logic; a Redirection Parameter containing the Forward To Number; an Originating Calling Number (OCN) (i.e., the remote phone number received on the original call from the user), and the user's Primary Number.

Next, the call is routed to the SSP 214 that serves the user's Primary Number. (S320) This may be accomplished by, for example, the IP's 216 application instructing the SSP 208 to perform a Two B Channel Transfer (TBCT).

A Termination Attempt Trigger (TAT trigger) on the user's Primary Number may then be used to cause the SSP 214 to issue a query to the ISCP 206. (S322). This query may include the Transaction Capability Application Part (TCAP) CPN value received in the received call, and may, for example, cause the ISCP 206 to invoke its service logic. As discussed above, this CPN value may be a unique CPN used by the service logic of ISCP 206 to invoke the Voice Portal's 218 service logic. The service logic employed by the ISCP 206 may be, for example, AIN service logic.

Based on the input Transaction Capability Application Part (TCAP) CPN value, the service logic of ISCP 206 determines that this is a Voice Portal 218 call. The service logic then retrieves the input TCAP OCN and the Redirection Parameters from the received call. The ISCP 206 may then retrieve the Forward to Number from the Redirection Parameters and send the OCN and Forward to Number to SSP 214 by populating this information via output TCAP calling party and called party parameters, respectively. (S324)

Based on the receipt of this information, the SSP 214 then forwards the call to the number the user wishes to call (i.e. the Forward to Number). (S326)

Next, the call is routed over the network 204 to the Forward to Number using the line class of service assigned to the user's Primary Number. The SSP associated with the Forward to Number determines if the associated phone 212 is available. If so, the phone 212 associated with this number begins ringing. If the call is answered, the call is completed, and the user primary number is appropriately billed. (S328)

In another example, voice portal 218 may be connected to various other servers for performing other services as described below with respect to FIG. 4. For example, the voice portal 218 may be connected to servers storing an address book for the user, such as described in U.S. Pat. No. 10/720,784 entitled Methods and Systems for Contact Management. In such an example, the user may dial a number associated with voice portal 218 and then, using voice commands, elect to place the call to a called party or "contact," whose number is listed in the user's address book. The user could then speak the name of the contact. In response, the server(s) may access the user's address book and retrieve the number for the contact. The call may then be forwarded as described above.

If the contact has multiple numbers in the address book (e.g., a work and a home number) the user may be provided with this information and permitted to select the desired number via speech or key entries on remote phone 202. The user may also search the address book to select a desired contact, modify the information for a contact or add a new contact using spoken commands or key entries on remote phone 202.

Figure 4:
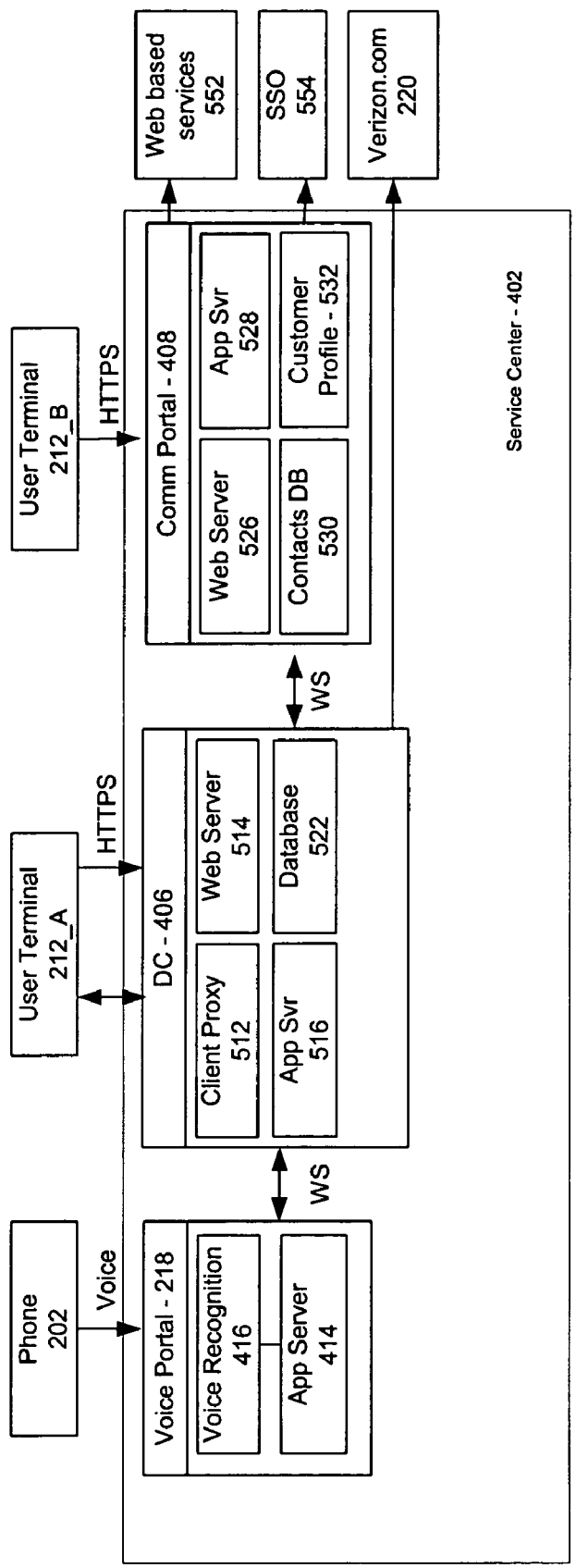
FIG. 4 illustrates a logical architecture of an exemplary system wherein the user may access an address book in establishing a call from a remote location, in accordance with methods and systems consistent with the invention.

FIG. 4 illustrates a logical architecture of an exemplary system wherein the user may access an address book when using voice portal 218 to remotely establish calls, in accordance with methods and systems consistent with the invention.

As illustrated, one or more user terminals, such as 212_A and 212_B, are connected to service center 402. This connection may be a direct connection or via a network such as, for example, the Internet. The user terminals 212 may be any appropriate type of device a user may use for communicating with a Service Center 106. For example, the user terminal 212_A may be a PDA running a program for communicating with the Service Center 106, while user terminal 212_B may be a desktop type computer running a web browser for communicating with the Service Center 106 via the Internet. Additionally, the user may call the voice portal 218 using a phone such as remote phone 202.

As illustrated, service center 106 may include one or more digital companion server(s) 406, one or more communication portal server(s) 408, and the voice portal 218. Servers 406, 408 and voice portal 218 may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, digital companion server(s) 406 may provide the following functions: a client proxy 512, a web server 514, an application server function 516, and a database function 522. Each of these functions may be performed in hardware, software, and/or firmware. Further, these functions may each be executed by a separate server, split across multiple servers, included on the same server functions, or any other manner.

The client proxy function 512 provides a proxy function for the digital companion that may be used for security purposes. This client proxy function 512 may be included in a separate server such that all communications sent from the other digital companion functions/servers to a user terminal 212 go through the client proxy 512. Also, if the client proxy 512 is included on a separate server, for example, an additional firewall may be provided between the client proxy 512 and the other digital companion servers to provide additional security.

Web server 514 provides functionality for receiving traffic over the data network 102 from a customer. For example, web server 514 may be a standard web server that a customer may access using a web browser program, such as Internet Explorer or Netscape Communicator.

Application server function 516 encompasses the general functions performed by the digital companion server(s) 406. For example, these functions may include interfacing with the various other digital companion functions to perform specific applications provided by the service center. These services may include, for example, interfacing with other function(s), software, and/or hardware to provide a customer with the capability of managing their calls online. For example, permitting a customer to add contacts to their address book from a history of calls made or received by the customer, and permitting a customer to modify, add or delete contacts in their address book, e.g., for example, using user terminals 212_A or 212_B.

Additionally, the application server function 516 may interface with one or more external devices, such as an external web server, for retrieving or sending information. For example, the application server function 516 may interface with a voice network's data center 220 (e.g., verizon.com) to determine the services to which the customer subscribes (e.g., call waiting, call forwarding, voice mail, etc.).

Database function 522 provides the storage of information useable by the various applications executed by the digital companion server(s) 406. These databases may be included in, for example, one or more external storage devices connected to the digital companion server(s) 406. Alternatively, the databases may be included in storage devices within the digital companion server(s) 406 themselves. The storage devices providing the database function 522 may be any type of storage device, such as for example, CD-ROMs, DVD's, disk drives, magnetic tape, etc.

The communication portal server(s) 408 may provide the hardware and software for managing a customer's account and interfacing with customer account information stored by the provider of the customer's voice network. As illustrated in FIG. 4, communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 522 of the digital companion servers, provides functionality for receiving traffic over a network from a customer. For example, the web server may be a standard web server that a customer may access using a web browser, such as Internet Explorer or Netscape Communicator.

The application server function 528 encompasses the general functions performed by the communication portal servers 406. For example, these functions may include interfacing with the voice network to retrieve and/or modify customer profile information, and creating and editing the address book for the user. Additionally, the application server function 528 may include the functionality of sending and/or receiving information to/from external servers and/or devices. For example, the communication portal servers 408 may be connected to a network, such as, the Internet. The application server function 528 may then provide connectivity over the Internet to external servers 552 that provide web services, such as the Superpages webpage. The application function 528 may then contact these external services 552 to retrieve information, such as an address and or number for a person in the user's address book.

In another example, the application server function 528 of the communication portal 408 may interface a single sign on (SSO) server 554. SSO 554 may be used to allow users to access all services to which the user subscribes, on the basis of a single authentication that is performed when they initially access the network.

The contacts database 530 includes storage devices for storing an address book for the user. This address book may be any type of address book. For example, the user's address book may include the names, phone numbers, and addresses of people and/or organizations. These storage devices may be internal or external to the communication portal servers 406 or some combination in between. In addition, these storage devices may be any type of storage device, such as magnetic storage, memory storage, etc.

The customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Figure 5:
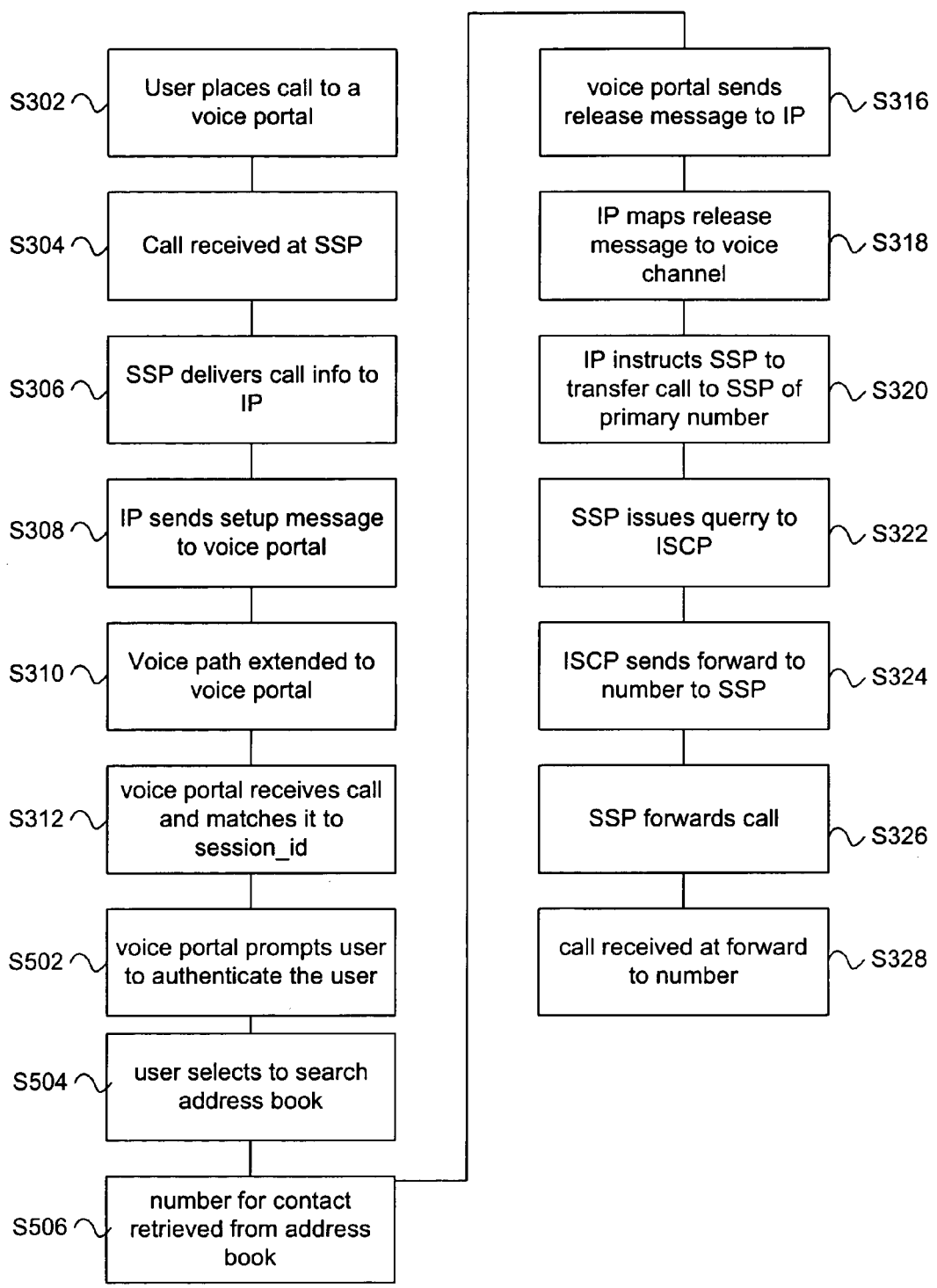
FIG. 5 illustrates a flow chart for a method for establishing a call from a remote location using an address book for the user, in accordance with methods and systems consistent with the invention

FIG. 5 illustrates a flow chart for a method for establishing a call from a remote location using an address book for the user, in accordance with methods and systems consistent with the invention, that will described in conjunction with FIGS. 2 and 3. A user desiring to make a remote call may initiate a call to voice portal 218 from remote phone 202, as discussed above in steps S302-S312. The user may then, using speech commands, authenticate himself by, for example, stating his name followed by a user specified password. (S502). The user may then elect to search his address book. (S504). For example, the voice portal 218 may recognize certain words (e.g., search, address book, etc.) or a sequence of key entries on the phone 202 as a request to search the address book. This request may then be forwarded by the voice portal 218 to the application server 516 of the digital companion server(s) 406. The application server 516 may then send a query to the application server 528 of the communication portal 408 to search and retrieve information regarding the contact. (S506)

For example, the voice portal 218 may inquire by synthesized or reworded voice prompt whether the user wishes to access their address book or whether the user wishes to simply enter a number. The user may then select to access their address book by speaking an appropriate command or by entering a particular digit(s) on the keypad of the phone 202. If the user elects to access their address book, the voice portal 218 may, for example, ask for the user to spell the name of the user. The voice portal 218 may then contact the digital companion server(s) 406 to look up this name in the user's address book and retrieve the contact's number. The call may then be forwarded to this number by, for example, the methods discussed above, e.g., steps S316-S328.

Additionally, if the user is unsure of the contacts name, the user may be presented with an option by the voice portal 218 to just speak the first few letters of the contacts name. The voice portal 218 may then retrieve all contacts from the user's address book including these first few letters. The user may then select from these retrieved names the desired contact by speaking an appropriate command or entering a digit on the keypad of their phone. The voice portal 218 may then retrieve the phone number for this contact from the address book and the call may be forwarded as discussed above.

Additionally, if the selected contact has multiple numbers (e.g., home, work, and cell), the voice portal 218 may inform the user of these multiple numbers and ask for the user to select the desired number.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for establishing a call from a first device to a second device, comprising:
   receiving, at a first switch, a call placed by a user from the first device, the first switch directing the call to a voice portal;
   at the voice portal, receiving from the first device speech information voiced by the user;
   deriving first information regarding the second device, using the speech information;
   receiving from the first device second information for associating the user with a third device;
   dropping the call to the voice portal and establishing a new call to a second switch associated with the third device, based on the second information;
   forwarding the new call from the second switch to a third switch using the first information, the third switch being associated with the second device; and
   completing the new call from the third switch to the second device.

2. The method of claim 1, further comprising:
   sending a prompt to the first device such that the first device provides the user with audible instructions.

3. The method of claim 1, wherein deriving first information comprises:
   deriving contact information regarding a contact stored in a user's address book from the speech information; and
   retrieving the first information from the address book using the contact information.

4. The method of claim 1, wherein deriving first information comprises:
   deriving a command to search an address book for a contact from the speech information;
   receiving search criteria from the user;
   retrieving contact information from the address book using the search criteria;

sending to the first device the retrieved contact information;
receiving from the first device selection information specifying at least one contact; and
deriving the first information using the selection information.

5. The method of claim 4, wherein receiving search criteria comprises receiving speech information from the user.

6. The method of claim 1, wherein receiving a call placed by a user of the first device comprises:
transferring signaling information regarding the call from the first switch to a first processor;
transferring information regarding the call from the first processor to a second processor;
transferring the call from the first switch to the second processor, wherein the second processor receives from the first device the information regarding the second and third devices;
redirecting by the first switch the call from the second set of processors to the second switch in response to an instruction from the first set of processors.

7. A system for establishing a call from a first device to a second device via a communication network, comprising:
a first switch for receiving a call placed by a user from a first device and directing the call to a voice portal, the voice portal for receiving from the first device speech information voiced by the user and deriving first information regarding the second device using the speech information, and receiving second information for associating the user with a third device;
a first set of one or more processors for causing the call to the voice portal to be dropped and establishing a new call to a second switch based on the second information, the second switch associated with the third device, the second switch for receiving the new call and forwarding the new call to the second device, based on the first information; and
a third switch for receiving the new call from the first switch and completing the new call to the second device based on the first information.

8. The system of claim 7, wherein the voice portal sends a prompt to the first device to provide the user with audible instructions.

9. The system of claim 7, further comprising:
a storage device storing an address book for the user; and
a second set of one or more processors for accessing the address book;
wherein the first set of processors is capable of recognizing a contact stored in the user's address book from the speech information and sending a query to the second set of processors regarding the contact; and
wherein the second set of processors, in response to the query, is capable of retrieving from the address book first information.

10. The system of claim 7, further comprising:
a storage device storing an address book for the user; and
a second set of one or more processors for accessing the address book;
wherein the first set of processors is capable of deriving a command to search the address book for a contact from the speech information, receiving search criteria from the first device, and sending a query to the second set of processors regarding the search criteria, receiving, in response to the query, from the second set of processors contact information using the search criteria, sending to the first device the received contact information, receiving selection information from the first device specifying at least one contact, and deriving the first information using the selection information and the contact information; and
wherein the second set of processors, in response to the query, is capable of retrieving contact information from the address book regarding one or more contacts using the search criteria and sending the contact information to the first set of processors.

11. The system of claim 10, wherein the received search criteria from the first device comprises speech information from a user of the first device.

12. A system for establishing a call from a first device to a second device, comprising:
means for receiving, at a first switch, a call placed by a user from the first device, the first switch directing the call to a voice portal;
at the voice portal, means for receiving from the first device speech information voiced by the user;
means for deriving first information regarding the second device, using the speech information;
means for receiving from the first device second information for associating the user with a third device;
means for dropping the call to the voice portal and establishing a new call to a second switch associated with the third device, based on the second information;
means for forwarding the new call from the second switch to a third switch using the first information, the third switch being associated with the second device; and
means for completing the new call from the third switch to the second device.

13. The system of claim 12, further comprising:
means for sending prompt information to the first device such that the first device provides the user with audible instructions.

14. The system of claim 12, wherein the means for deriving first information comprises:
means for deriving from the speech information contact information regarding a contact stored in a user's address book; and
means for retrieving the first information from the address book using the contact information.

15. The system of claim 12, wherein the means for receiving from the first device information regarding the second device comprises:
means for deriving from the speech information a command to search an address book for a contact;
means for receiving search criteria from the user;
means for retrieving contact information from the address book using the search criteria;
means for forwarding to the first device the information retrieved from the address book;
means for receiving from the first device selection information specifying at least one contact; and
means for deriving the first information using the selection information.

16. The system of claim 14, wherein the received search criteria from the first device comprises speech information.

* * * * *